Apr. 10, 1923.  1,451,080
L. MINTROP
FIELD SEISMOGRAPH
Filed May 15, 1922  3 sheets-sheet 1
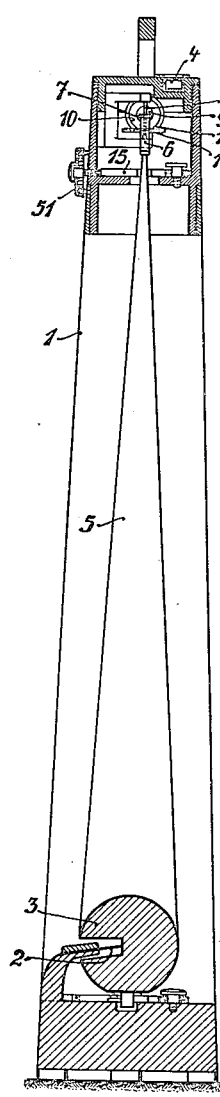
Inventor
Ludger Mintrop
By [signature]
Attorney.

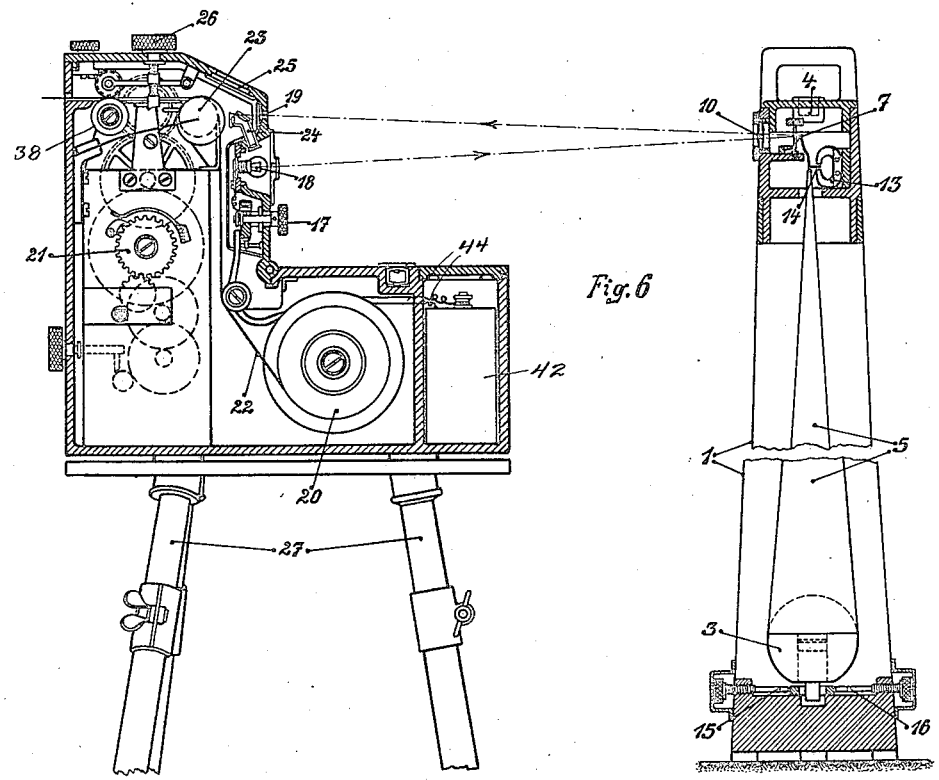
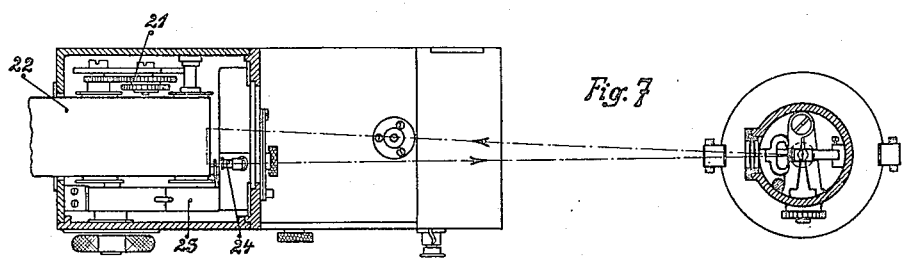

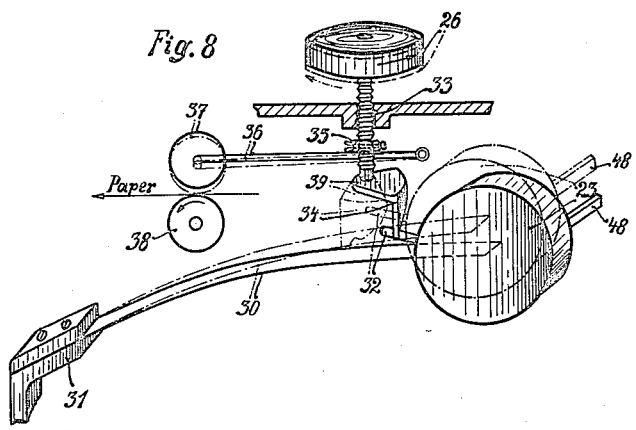
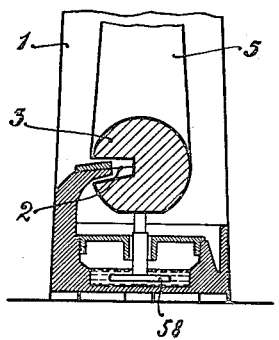

Patented Apr. 10, 1923.

1,451,080

UNITED STATES PATENT OFFICE.

LUDGER MINTROP, OF HANOVER, GERMANY.

FIELD SEISMOGRAPH.

Application filed May 15, 1922. Serial No. 561,226.

*To all whom it may concern:*

Be it known that I, LUDGER MINTROP, a citizen of Germany, residing at Hanover, Germany, have invented certain new and useful Improvements in Field Seismographs, of which the following is a specification.

My invention has reference to a device adapted for ascertaining vibrations of the ground and to record the same in shape of a curve, and it is one of the important objects of the device constructed according to my invention to provide means whereby it is not necessary to mount the device permanently in a certain position, but to so arrange and construct the same, that it is portable and may be erected in a short time ready for operation at any suitable place. The particular object of a device according to my invention which broadly speaking, belongs to the class of instruments generally designated by the term seismographs is the measuring of such vibrations and agitations of the ground which are produced by artificial means, such as detonations, blasting and the like with a view of drawing conclusions in regard to the geological condition of the ground from the particular configuration of the waves or undulations of the terrestrial vibrations. In the practice of my invention I provide an elastically or yieldingly suspended weight which, as a result of its inertia remains at rest even when the casing of the device which is erected upon the ground is vibrated by the vibrations or agitations of the ground. By means of this a relative movement of the weight and the casing respectively will be effected which by suitable mechanical means is utilized for the rotation of a small mirror. Upon this mirror a shaft of parallel rays of light is projected which are preferably produced by a small electric lamp and some lenses, the beam of light which is reflected by the mirror being oscillated upon a rotation of the same. The reflected ray is directed upon a web of photographic or sensitive paper or a film moved at right angle to the direction of the oscillation, and a curve will be produced thereby on this paper or film which represents the dependency of the terrestrial oscillations upon the time. In order to obtain a sufficiently large curve also with small rotations of the mirror it is of advantage to make the distance between the mirror and the sensitive web comparatively large because in such case a small rotation of the mirror will correspond to a comparatively larger movement of the luminous point upon the web or paper. The said distance being preferably about 3½ to 7 feet (about one to two meters), it is preferable to mount the entire device in two casings which are then erected at a distance of about 3½ to seven feet from each other, and in this manner either casing may be of a size convenient for easy transportation. One of the casings contains a pendulum which constitutes the yieldingly suspended weight with the rotatable mirror while the other casing contains the electric lamp serving as a source of light and the movable web of sensitive paper and several auxiliary means still to be described. It is a point of importance that the parts housed in the two casings, though separated from each other during transportation, constitute a unit in the operative position, inasmuch as the recording of the terrestrial vibrations is neither possible by the pendulum without the source of light and without the light-sensitive paper nor will the source of light and the movable sensitive web be sufficient to produce the desired record without the action of the pendulum. Similar to the operation of a stationary seismograph in which the instrument drum and the paper or recording drum are connected into a unit by a mechanical system of levers or the like the connection is effected in my invention by the proper guiding of the rays of light which takes the place of the system of levers referred to.

The accompanying drawing illustrates by way of example a preferred embodiment of my invention, Fig. 1 being a vertical transverse section through the pendulum;

Fig. 2 is a vertical longitudinal section of the upper part of the pendulum on an enlarged scale.

Fig. 3 is a horizontal section of the upper part of the pendulum.

Fig. 4 is a plan view of the lower locking device of the pendulum.

Fig. 5 shows a vertical section through an oil dampening member.

Fig. 6 is a longitudinal sectional view through the casing for the source of light and the web of paper, also showing the cooperation with the pendulum.

Fig. 7 is a horizontal section through this casing.

Fig. 8 is a detail of the same in perspective views and on an enlarged scale.

Referring particularly to Fig. 1, 1 is a casing which can be placed in an exactly vertical position by means of a levelling instrument 4 in which a weight 3 is suspended from a substantially horizontal leaf spring 2. To the weight 3 a light weighted lever arm 5 is connected which in the present example is shaped as a cone of sheet aluminium and one end of which is connected to a thin leaf spring 6 the upper portion of which carries a transverse horizontal short frictional yoke 7. This frictional member 7 is shown in Fig. 2 in cross section so as to appear as a very small circle. Under the action of the slight pressure of the leaf spring 6 the yoke 7 bears upon a vertical thin axle which is mounted in agate bearings or the like with its pointed ends 40 and 41. The axle 8 carries a small mirror 9. If the casing 1 is, for instance, moved in the upward direction the weight 3 on account of its inertia is lagging back instead of immediately following this movement, and the leaf spring 2 is somewhat downwardly bent so as to become slightly curved. At the same time, however, the lever arm 5 besides being downwardly moved is shifted towards the right at a much greater speed and turns the axle of the mirror by means of the frictional member which has likewise been moved to the right, so that the mirror is also submitted to a small rotation on a vertical axis.

In front of the mirror a collector lens 10 is mounted in an aperture of the casing, through which a shaft of light originating from the outside is condensed into a point upon the mirror, and through which the light reflected from the mirror is again allowed to be outwardly projected.

The axle 9 carries a horizontal iron stud 11 shown in cross section in Fig. 2 and mounted in a cavity of the axle below the mirror 9. The ends of this stud are arranged in front of the terminals of a horse shoe magnet 12 (Fig. 3) which has the tendency to impart always the same position illustrated in Fig. 3 to the iron stud 11. By this means the mirror will always return to its initial position even after the most vigorous vibrations of the pendulum. The dampening of the bodily oscillations of the pendulum is effected by means of a horse shoe magnet 13 into the magnetic field of which a horizontal thin plate of iron 14 secured to a movable part of the device, is allowed to project. Instead of the magnetic dampening by means of the parts 13 and 14 an oil dampening member may also be employed which may, for instance, be constructed by providing the weight 3 at its bottom part and by means of a stud with the plate 58 which is immersed in a bath filled with oil, glycerin or with a similar liquid, as shown in Fig. 5.

For shipping and carrying purposes it becomes necessary to clamp the pendulum in position at its upper and lower parts. The pair of tongues 15 shown in Figs. 1 and 3, and which are rotatably secured to the screw 53 embrace the upper portion of the aluminium cone 5 and clamp the same in position upon being compressed by means of the rotatable button 51. The tongues are provided with projections 52 the outer surfaces of which bear against the inner portion of the button 51, as shown at 50, and inasmuch as this inner marginal portion, as seen in the direction of the pivoting axis of the button is spirally shaped it produces an inward pressure upon a rotation of the button. Beneath the weight 3 I provide another pair of tongues indicated at 16 and ordinarily retained in the open position by means of two leaf springs 55, stationarily secured at 54, and adapted to be compressed for carrying purposes by means of the screws 56.

The operation of the steel spindle 8 and of the frictional member 7 may be improved by making these parts of magnetic material with the result that they may be compressed with increased force, so as to produce an increased reliability in the transmission of movement.

Referring now to Figs. 6 and 7, numeral 43 indicates a casing supported upon three strong legs 27. One or two dry batteries 42 are electrically connected to the small lamp 18 by the conduit 44 and by means of a switch button 17. The path of the shaft of light emitted by the lamp 18 is such as to cause it to be projected through the collector lens 10 of the pendulum casing 1, the light being condensed by the lens in such a manner as to produce a sharp image of the vertically mounted glowing filament in the mirror provided in the pendulum casing. The rays of light after being reflected by the mirror are again passed through the lens 10 and are projected as a shaft of parallel rays upon the cylinder lens 19 provided in the recorder casing. By this lens the shaft of light is condensed in the vertical plane to a luminous point without interfering with the movement of the shaft of light in the horizontal plane as produced by the rotation of the mirror 9. Through the luminous point a web of photographic paper or the like 22 is drawn off from a supply roller 20 by means of a suitable driving mechanism 21, the oscillations of the mirror 9 of the pendulum resulting from the vibrations being reproduced upon the web in shape of a curve. The driving mechanism 21 is an ordinary spring actuated clock adapted to produce the rotation of the roller 38 and the consequent movement of the web of paper in the manner hereinafter described. Furthermore than that, the photographic recorder is provided with means for producing luminous marks upon the photographic paper, and for this purpose an optical light conducting appliance is employed, broadly indicated at 24, which consists of a deflecting mirror and a collector lens, and adapted to throw part of the light of the small lamp 18 upwards so that the luminous point thereby produced upon the web of paper describes a continuous line during the movement of the paper. A time pendulum is moreover provided comprising a weight indicated at 23 in Figs. 6, 7 and 8 and supported by a leaf spring 30 (Fig. 8), the other end of which is secured to the casing at 31. The weight 23 also carries a projection 48, which similar to a shutter operates to temporarily intercept the path of the light from the optical appliance mentioned to the web of paper upon the rocking of the pendulum, so as to produce time marks upon the web of paper. There is also provided upon the weight 23 a pin 32 cooperating with the button 26. By the turning of this button 26 the time pendulum may be operated, and the movement of the web of paper may be started. At its bottom the button 26 is provided with a screw spindle or shaft which is mounted in a threaded bearing 33 in the casing. At its lower end the screw spindle has a short arm 39 with a disc 34. Upon turning the button anticlockwise, as seen from above, the disc 34 is moved in the direction of the pin 32 of the weight 23, and forces it downwards in view of the inclination at the right hand side of the bottom part of the disc, which results in the tensioning of the spring 30, and the simultaneous arresting of the weight. By turning the button in the opposite direction the pendulum is released, and is moved by the then unloaded spring. Furthermore than that, the screw shaft 33 carries a nut 35 permanently and rigidly secured thereto. By turning the button 26 clockwise this nut 35 in view of the screw bearing provided at 33, is moved downwards and is forced against the lever 36 which is pivoted to the casing at the right hand side of the drawing, and the left end of which terminates in a roller 37. Beneath the roller 37 a continuously actuated roller is mounted driven by the clock work, and between the rollers the strip or web of light sensitive paper is arranged. Inasmuch as the roller 37 is ordinarily somewhat raised by a spring, not shown, the web of paper rests loosely and immovably upon the roller 38. Upon, however, depressing the roller 37 by the lever 36 the web of paper is pressed against the roller 38, and is moved thereby.

A yellow or red window 25 allows of inspecting the curve and the time marks from the outside. The entire casing is carefully horizontally erected by means of a box level or the like. When marching it may easily be carried by one man, and the same applies to the casing of the pendulum.

While I have shown my invention for the purposes of illustration in one preferred embodiment I wish it to be understood that I am not limited thereto, but reserve the right to effect modifications and changes of the several parts and of the combination thereof within the spirit of my invention as defined by the claims.

I claim:

1. Recording means for terrestrial vibrations, comprising in combination, a stationarily secured spring, a weight yieldingly supported on said spring, a long comparatively light-weighted lever secured to said weight, a rotatable mirror, operatively associated with said lever, a source of light operatively related to said mirror, and a movable light sensitive web adapted to cooperate with said mirror, and to be influenced by the rays reflected from said mirror.

2. Recording means for terrestrial vibrations comprising a portable casing, a weight in said casing, a supporting spring for said weight stationarily mounted in the casing, a comparatively long lever secured to the weight, a movable mirror operatively related to said mirror, a source of light, adapted to emit light on said mirror, a movable light sensitive web adapted to be moved past said mirror and oscillation dampening means within said casing in operative relation with said pendulum and said mirror.

3. In recording means for terrestrial vibrations, an oscillatably supported weight, a long comparatively light weighted extension on said weight, a rotatable mirror in operative relation with said extension, a source of light, a movable sensitive web, adapted to be influenced by said mirror, web operating means, means for producing time marks on said web and a portable casing enclosing said time mark producing means, said web operating means, said source of light, and said web.

4. Recording means for terrestrial vibrations, comprising an oscillatably supported weight, a light weighted extension on said weight, a frictional member on said extension, a vertical rotatable mirror, operatively engageable with said frictional member, and light sensitive means adapted to be influenced by said mirror.

5. Recording means for terrestrial vibrations, comprising an oscillatably supported weight, a light weighted extension on said weight; a magnetic frictional member on said extension, a vertical rotatable shaft adapted for magnetic operation by said frictional member, a mirror on said shaft, and light sensitive means adapted to be influenced by said mirror.

6. Recording means for terrestrial vibrations including a weight, oscillatably supported, a comparatively long extension on said weight, a rockable mirror operatively related to said extension, a source of light, and movable light sensitive means adapted to be influenced by said mirror, a magnetically influenced member at the upper portion of said extension, and a stationarily supported magnet operatively related to said member.

7. Recording means for terrestrial vibrations including an oscillatably supported weight, a rockable mirror, operatively related to said extension, a source of light, and movable light sensitive means adapted to be influenced by said mirror, an oil bath, and a projecting member on said weight, immersed in said oil bath.

8. In recording means for terrestrial vibrations, an oscillatably supported weight, a comparative-light weighted lever on said weight, a rockingly supported mirror, operatively conected to said lever, movable light sensitive means influenced by said mirror, oscillation dampening means associated with said lever, clamping means engageable with said lever and said weight, and operating means for said clamping means.

9. Recording means for terrestrial vibrations comprising in combination, an oscillatably supported weight, a rockable mirror, operatively related to said weight, a battery, an electric lamp, fed by said battery, and emitting light on said mirror, a stationarily supported cylindrical lens adapted to receive reflected light from said mirror, movable light sensitive means intermediate said mirror and said lens, the said lens being adapted to condense the light in the vertical plane, and without influencing the light in the horizontal plane.

10. Recording device for terrestrial vibrations including an electric lamp, an oscillatingly supported weight, an extension on said weight, a rockingly supported mirror operatively related to said extension, and adapted for cooperation with said mirror, a cylindrical lens in light reflecting relation to said mirror, and optical light-conducting means adjacent said cylindrical lens, a movable light sensitive web confronting said light conducting means, time-mark producing means, comprising a substantially horizontal leaf spring, a time regulating weight supported on said spring, and a projection on said weight adapted for barring the way of the light projected from the lamp through the light conducting means on said movable web.

11. Recording device for terrestrial vibrations, comprising in combination, an electric lamp, an oscillatable weight, a comparatively long light-weighted lever on said weight, and adapted for cooperation with said lamp, a cylindrical lens in light receiving and emitting relationship to said lamp, a movable light sensitive web spaced from said cylindrical lens and confronting the same, moving means for said web, an oscillatably secured time pendulum, a rotatable operating button in operative relation with said web, a permanently rotated roller on said moving means engageable with said web by the operation of said button, stopping and releasing means on said button engageable with said time weight, and means on said time weight adapted for intercepting the light projected on said web.

In testimony whereof I affix my signature.

LUDGER MINTROP.